(12) United States Patent
Miyamoto et al.

(10) Patent No.: US 9,197,029 B2
(45) Date of Patent: Nov. 24, 2015

(54) MODE CONTROL WAVEGUIDE-TYPE LASER DEVICE

(75) Inventors: Noriyuki Miyamoto, Tokyo (JP);
Shuhei Yamamoto, Tokyo (JP);
Takayuki Yanagisawa, Tokyo (JP);
Yoshihito Hirano, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 413 days.

(21) Appl. No.: 13/810,750

(22) PCT Filed: Dec. 21, 2010

(86) PCT No.: PCT/JP2010/072999
§ 371 (c)(1),
(2), (4) Date: Jan. 17, 2013

(87) PCT Pub. No.: WO2012/086009
PCT Pub. Date: Jun. 28, 2012

(65) Prior Publication Data
US 2013/0121355 A1    May 16, 2013

(51) Int. Cl.
| H01S 3/098 | (2006.01) |
| H01S 3/04 | (2006.01) |
| H01S 3/063 | (2006.01) |
| H01S 3/08 | (2006.01) |
| H01S 3/042 | (2006.01) |
| H01S 3/23 | (2006.01) |

(52) U.S. Cl.
CPC .............. *H01S 3/04* (2013.01); *H01S 3/0632* (2013.01); *H01S 3/08072* (2013.01); *H01S 3/042* (2013.01); *H01S 3/0635* (2013.01); *H01S 3/2308* (2013.01); *H01S 3/2383* (2013.01)

(58) Field of Classification Search
USPC ................................. 372/19, 29.014, 31, 34
See application file for complete search history.

(56) References Cited

U.S. PATENT DOCUMENTS

2003/0160034 A1    8/2003  Filgas et al.
2008/0095202 A1*   4/2008  Yanagisawa et al. ........... 372/19

FOREIGN PATENT DOCUMENTS

| JP | 6 85357 | 3/1994 |
| JP | 2011-176257 | 9/2011 |
| WO | 2006 103767 | 10/2006 |

OTHER PUBLICATIONS

International Search Report Issued Jan. 25, 2011 in PCT/JP10/72999 Filed Dec. 21, 2010.
Preliminary Notice of Reasons for Rejection issued Apr. 23, 2013 in Japanese Patent Application No. 2012-549510 (with English translation).
The Extended European Search Report issued Dec. 12, 2013, in Application No. / Patent No. 10861126.0—1564 / 2590276 PCT/JP2010072999.
Lee W. Tutt, et al., "A Review of Optical Limiting Mechanisms and Devices using Organics Fullerenes, semiconductors and other Materials" Progress in Quantum Electronics, vol. 17, No. 4, XP 025729648, 1993, pp. 299-338.

* cited by examiner

*Primary Examiner* — Dung Nguyen
(74) *Attorney, Agent, or Firm* — Oblon, McClelland, Maier & Neustadt, L.L.P.

(57) ABSTRACT

In a laser device, a control range of focal distance of a generated thermal lens is broadened and reliability is improved. A mode control waveguide-type laser device includes: a planar laser medium having a waveguide structure in a thickness direction of a cross section perpendicular to an optical axis, for generating gain with respect to laser light; a cladding bonded onto the laser medium; and a heat sink bonded onto the laser medium. The laser medium generates a lens effect, and the laser light oscillates in a waveguide mode in the thickness direction, and oscillates in a spatial mode due to the lens effect in a direction perpendicular to the optical axis and the thickness direction. The refractive index distribution within the laser medium is created by generating a temperature distribution in the laser medium depending on a junction area of the cladding and the heat sink.

8 Claims, 4 Drawing Sheets

MODE CONTROL WAVEGUIDE-TYPE LASER DEVICE

TECHNICAL FIELD

The present invention relates to a mode control waveguide-type laser device which is used in a high power laser device.

BACKGROUND ART

Figure 9:
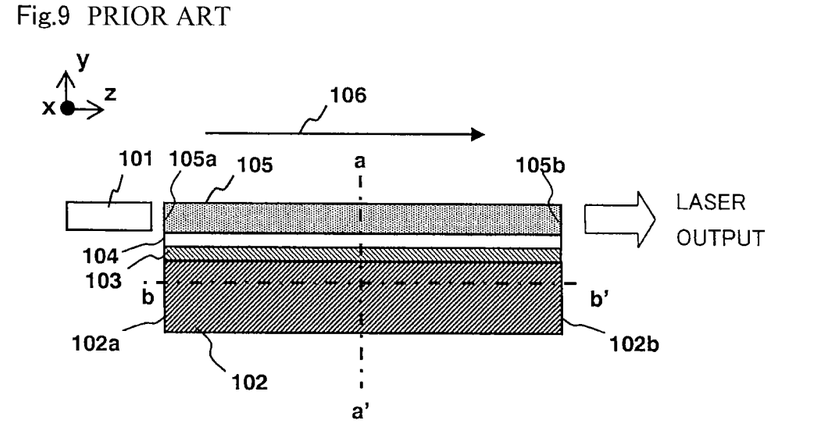
FIG. 9 A side view illustrating a structure of a conventional mode control waveguide-type laser device.
Figure 10:
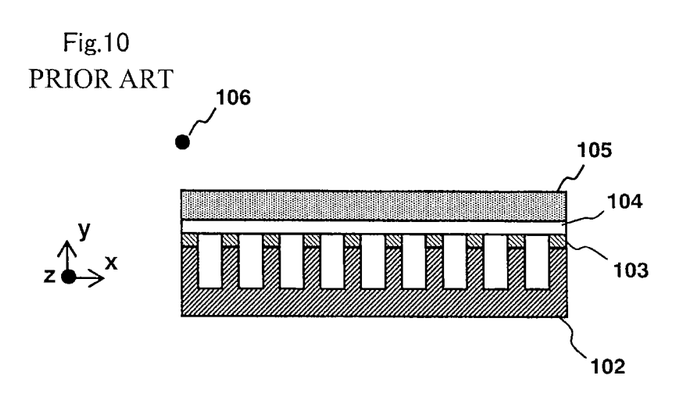
FIG. 10 A cross sectional view taken along the cross section line a-a' of FIG. 9 as seen from a laser exit side.
Figure 11:
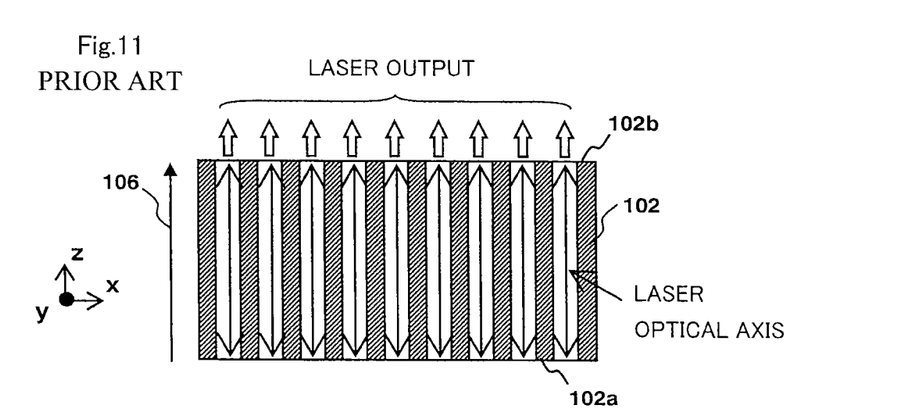
FIG. 11 A cross sectional view taken along the cross section line b-b' of FIG. 9 as seen from the top face.

Conventionally, a mode control waveguide-type laser device as illustrated in FIGS. 9, 10, and 11 has been proposed to realize a laser device capable of oscillating in high luminance (for example, see Patent Literature 1).

FIG. 9 is a side view illustrating a structure of the conventional mode control waveguide-type laser device. FIG. 10 is a cross sectional view taken along the cross section line a-a' of FIG. 9 as seen from a laser exit side, and FIG. 11 is a cross sectional view taken along the cross section line b-b' of FIG. 9 as seen from the top face.

In FIGS. 9 to 11, the conventional mode control waveguide-type laser device includes a semiconductor laser 101 for excitation for emitting excited light, a laser medium 105 for emitting laser light, a cladding 104 bonded onto the lower surface of the laser medium 105, and a heat sink 102 bonded with a bonding agent 103 onto the lower surface of the cladding 104.

The laser medium 105 is planar and has a waveguide structure in a thickness direction (y axis) of a cross section perpendicular to an optical axis 106 (z axis) representing a laser oscillation direction, and has a cyclic lens effect in a direction (x axis) perpendicular to the optical axis 106 and the thickness direction.

A total reflection coating that reflects laser light is provided on an end surface 105a on the incident side of the laser medium 105, and an anti-reflection coating that reflects a part of laser light and transmits a part thereof is provided on an end surface 105b on the exit side. These total reflection coating and partial reflection coating are formed by, for example, laminating dielectric thin films.

As illustrated in FIG. 9, when the excitation light exiting from the semiconductor laser 101 enters from the end surface 105a of the laser medium 105, the total reflection coating of the end surface 105a becomes an optical film which transmits the excitation light and reflects the laser light.

Moreover, as illustrated in FIGS. 10 and 11, the heat sink 102 has an extended comb structure parallel to the optical axis 106 (z axis).

The excitation light entering from the end surface 105a of the laser medium 105 is absorbed in the laser medium 105 to generate gain with respect to the laser light inside of the laser medium 105.

The gain generated inside of the laser medium 105 causes the laser light to laser-oscillate between the end surface 105a and the end surface 105b of the laser medium 105 which are perpendicular to the optical axis 106, and a part of the oscillation light is output from the end surface 105b to the outside of a laser resonator.

In the conventional mode control waveguide-type laser device illustrated in FIGS. 9 to 11, when laser power required for the laser device is determined, necessary excitation power is determined.

Moreover, according to a power scale of the determined excitation power, an excitation region of the excitation light in the waveguide width direction (X axis direction) is determined, and further a mutual space of teeth of the extended comb structure of the heat sink 102 is determined depending on the excitation region.

CITATION LIST

Patent Literature

[PTL 1]: JP 4392024 B

SUMMARY OF INVENTION

Technical Problem

In the conventional mode control waveguide-type laser device, the excitation region of the excitation light in the waveguide width direction is determined in accordance with the excitation power depending on the laser power required for the laser device, and the space of teeth of the heat sink is determined depending on the excitation region. Therefore, there has been a problem in which the focal distance of a generated thermal lens is limited in its control range.

The present invention has been made to solve the above-mentioned problem, and an object thereof is to obtain a mode control waveguide-type laser device in which heat is discharged on a whole surface in a place where heat generation is large and a thermal lens is created in a place where heat generation is small, thereby broadening the control range of the focal distance of the generated thermal lens to improve reliability.

Solution to Problem

According to the present invention, there is provided a mode control waveguide-type laser device, including: a laser medium which is planar and has a waveguide structure in a thickness direction of a cross section perpendicular to an optical axis, for generating gain with respect to laser light; a cladding bonded onto one surface of the laser medium; and a heat sink bonded via the cladding onto the one surface side of the laser medium, in which the laser medium generates a lens effect due to a refractive index distribution, in which the laser light oscillates in a waveguide mode in the thickness direction, and oscillates in a spatial mode due to the lens effect in a direction perpendicular to the optical axis and the thickness direction, and in which the refractive index distribution within the laser medium is created by generating a desired temperature distribution in the laser medium depending on a junction area of the cladding with the heat sink.

Advantageous Effects of Invention

According to the present invention, it is possible to improve reliability by adjusting a junction area of the cladding with the heat sink so that the refractive index distribution and the lens effect generated within the laser medium can be adjusted, and by discharging heat on the whole surface in the place where heat generation is large to drop temperature, and creating the thermal lens in the place where heat generation is small.

BRIEF DESCRIPTION OF DRAWINGS

FIG. 1A side view illustrating a structure of a mode control waveguide-type laser device according to a first embodiment of the present invention (Example 1).

DESCRIPTION OF EMBODIMENTS

Example 1

The best embodiment for carrying out the present invention is hereinafter described with reference to the drawings.

Figure 1:
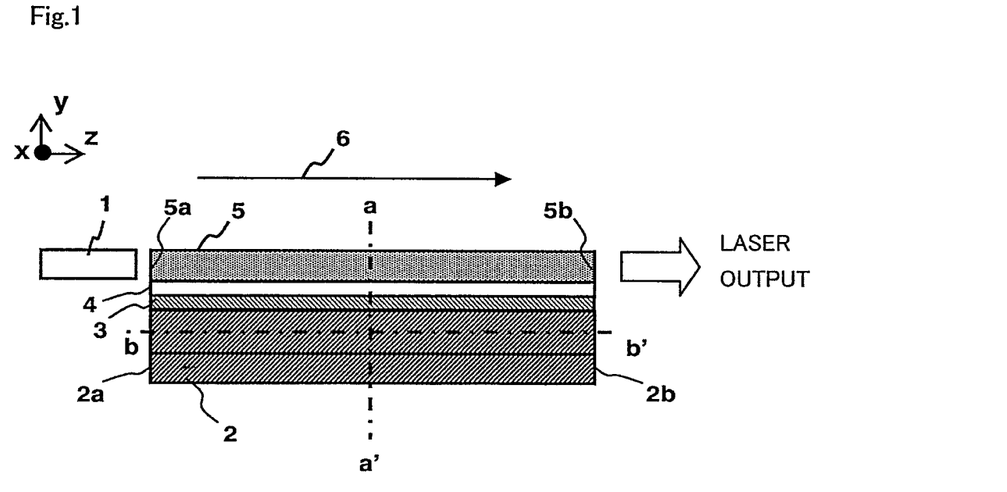
Figure 2:
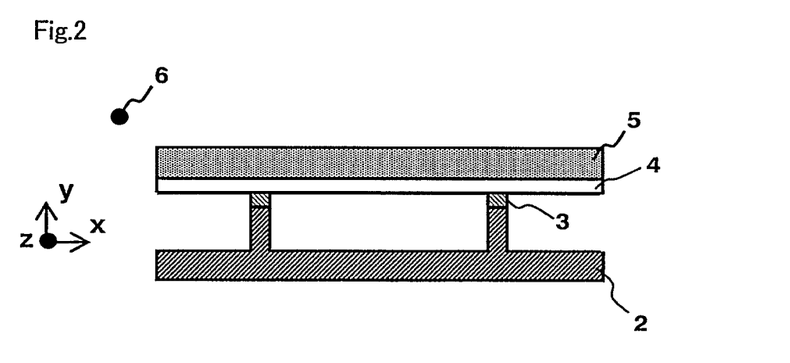
FIG. 2 A cross sectional view taken along the cross section line a-a' of FIG. 1 as seen from a laser exit side (Example 1).
Figure 3:
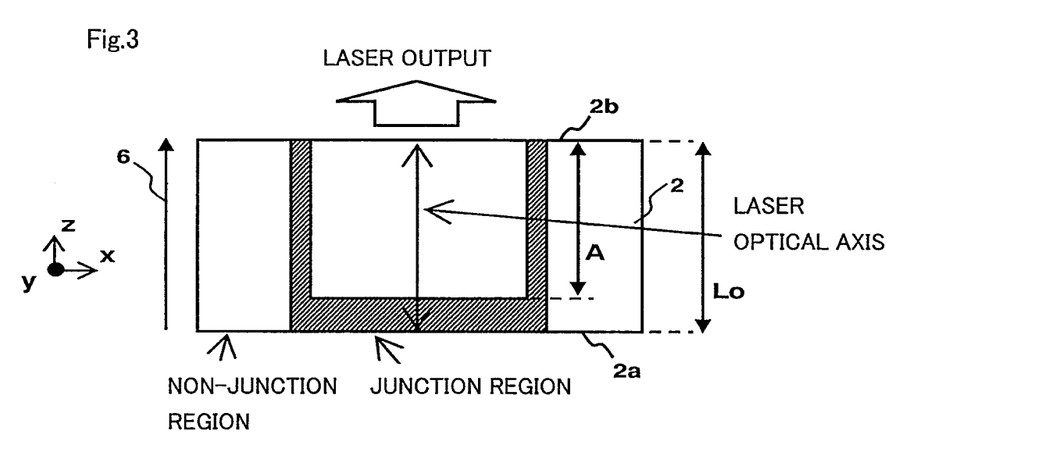
FIG. 3 A cross sectional view taken along the cross section line b-b' of FIG. 1 as seen from the top face (Example 1).

FIGS. 1 to 3 are diagrams illustrating a structure of a mode control waveguide-type laser device according to a first embodiment of the present invention. FIG. 1 is a side view, FIG. 2 is a cross sectional view taken along the cross section line a-a' of FIG. 1 as seen from an optical axis, and FIG. 3 is a cross sectional view taken along the cross section line b-b' of FIG. 1 as seen from the top face.

In FIGS. 1 to 3, the mode control waveguide-type laser device according to the first embodiment of the present invention includes pumping light incident means 1, a laser medium 5 to which excitation light enters and from which laser light exits, a cladding 4 bonded onto the lower surface of the laser medium 5, and a heat sink 2 bonded onto the lower surface of the cladding 4 with a bonding agent 3.

The laser medium 5 is planar and has a waveguide structure in a thickness direction of a cross section perpendicular to an optical axis 6 representing a laser oscillation direction or a signal light advance direction.

In the laser medium 5, the shape of end surfaces 5a and 5b perpendicular to the optical axis 6 is, for example, a rectangular which typically has the size of several μm to dozens of μm in thickness in the y axis direction and hundreds of μm to several mm in width in the x axis direction.

Here, there is used a coordinate assuming that the long side direction of each of the end surfaces 5a and 5b of the rectangle is the x axis, the short side direction thereof is the y axis, and the direction of the optical axis 6 is the z axis.

In addition, the shape of each of the end surfaces 5a and 5b of the laser medium 5 does not necessarily be rectangle, and, for example, the end surfaces 5a and 5b may have an arc shape in the short side thereof.

The cladding 4, which has a smaller refractive index than the laser medium 5, is bonded onto one surface parallel to an x-z plane of the laser medium 5.

The cladding 4 is formed by, for example, depositing in vapor a film of an optical material as a raw material, or optically bonding the optical material onto the laser medium 5 by optical contact, diffusion bonding, or the like. Moreover, an optical adhesive which has a smaller refractive index than the laser medium 5 may be used as the cladding 4.

The heat sink 2 is made of a material having a large thermal conductivity and has a comb shape (see hatching part in FIG. 3) in a portion of a cross section (y-z plane) parallel to the optical axis 6. The end surface in the comb shape of the heat sink 2 is bonded via the bonding agent 3 to the cladding 4.

Moreover, the heat sink 2 has end surfaces 2a and 2b corresponding to the end surface 5a on the incident side and the end surface 5b on the exit side, respectively, of the laser medium 5.

The bonding agent 3 can be realized by metal solder, an optical adhesive, a thermal conductive adhesive, or the like, and heat generated by the laser medium 5 is discharged via the cladding 4 to the heat sink 2.

In addition, metallization (adhering a metal film) may be performed to the lower surface of the cladding 4 to increase the bonding strength of the bonding agent 3.

Moreover, in the case where the heat sink 2 is made of an optical material, the cladding 4 and the heat sink 2 may be directly bonded together by, for example, optical contact, diffusion bonding, or the like.

The pumping light incident means 1 is formed of, for example, a semiconductor laser and is disposed near the end surface 5a of the laser medium 5, or, if necessary, is disposed while a combined optical system (not shown) is inserted between the excitation light exiting end surface and the end surface 5a of the laser medium 5.

Moreover, a heat sink for cooling (not shown) is bonded onto the pumping light incident means 1, as necessary.

The excitation light exiting from the pumping light incident means 1 enters from the end surface 5a of the laser medium 5 to an x-z plane direction to be absorbed by the laser medium 5.

In addition, although a semiconductor laser is used for the pumping light incident means 1 as one example here, it is not necessarily required to use the semiconductor laser, as long as the laser medium 5 can have gain.

A total reflection coating for reflecting laser light is provided on the end surface 5a of the laser medium 5, and a partial reflection coating for transmitting a part of the laser light is provided on the end surface 5b. These total reflection coating and partial reflection coating are formed by, for example, laminating dielectric thin films.

In addition, when the excitation light exiting from the pumping light incident means 1 enters from the end surface 5a of the laser medium 5, the total reflection coating of the end surface 5a becomes an optical film which transmits the excitation light and reflects the laser light.

A general solid-state laser material can be used as a material of the laser medium 5. Examples thereof include Nd:YAG, Nd:YLF, Nd:Glass, Nd:YVO4, Nd:GdVO4, Yb:YAG, Yb:YLF, Yb:KGW, Yb:KYW, Er:Glass, Er:YAG, Tm:YAG, Tm:YLF, Ho:YAG, Ho:YLF, Ho:YAG, Ho:YLF, Ti:Sapphire, and Cr:LiSAF.

By the way, in FIG. 1, the upper surface of the laser medium 5 is held in contact with air, but it a second cladding (not shown) having a smaller refractive index than the laser medium 5 may be bonded onto the upper surface of the laser medium 5.

Thus, in the case where the second cladding is bonded onto the upper surface of the laser medium 5, it is possible to optionally adjust a propagation mode in the y axis direction of the laser medium 5 by adjusting the difference in refractive index between the laser medium 5 and the second cladding.

Moreover, when the thickness of the second cladding in the y axis direction is set to be large, it is possible to increase the rigidity of the laser medium 5 without affecting the waveguide mode of the laser medium 5.

By the way, a substrate (not shown) may be bonded onto the upper surface of the laser medium 5 via a second bonding agent having a smaller refractive index than the laser medium 5.

As the second bonding agent, for example, an optical adhesive is used, and as the substrate, for example, an optical material or metal is used.

Thus, in the case where the second bonding agent and the substrate are bonded onto the upper surface of the laser medium 5, it is possible to optionally adjust the propagation mode in the y axis direction of the laser medium 5 by adjusting the difference in refractive index between the laser medium 5 and the second bonding agent.

Moreover, when the thickness of the substrate in the y axis direction is set to be large, it is possible to increase the rigidity of the laser medium 5 without affecting the waveguide mode of the laser medium 5.

Moreover, when thermal expansion occurs due to the rise of temperature of the laser medium 5, because the second bonding agent (optical adhesive) has lower rigidity than a crystal or glass material and is deformed in accordance with to the expansion of the laser medium 5, it is possible to relieve stress given to the laser medium 5.

Further, an optical film (not shown) having a smaller refractive index than the laser medium 5 may be provided on the upper surface of the laser medium 5, and a substrate (not shown) having substantially the same coefficient of thermal expansion with that of the laser medium 5 may be bonded onto the surface of the optical film by optical contact or diffusion bonding.

Thus, in the case where the optical film and the substrate are bonded onto the upper surface of the laser medium 5, it is possible to optionally adjust the propagation mode in the y axis direction of the laser medium 5 by adjusting the difference in refractive index between the laser medium 5 and the optical film.

Moreover, when the thickness of the substrate in the y axis direction is set to be large, it is possible to increase the rigidity of the laser medium 5 without affecting the waveguide mode of the laser medium 5.

Moreover, because the laser medium 5 and the substrate have substantially the same coefficient of thermal expansion, when thermal expansion occurs due to the rise of temperature of the laser medium 5, the substrate also expands at substantially the same rate.

In such a case, because the optical film between the laser medium 5 and the substrate has lower density and rigidity than a crystal or glass material and is deformed in accordance with the expansion of the substrate, it is possible to relieve stress given to the laser medium 5.

Moreover, when bonding the optical film with the substrate, it is possible to increase the strength of the bonding by selecting an optical material and a substrate which can be easily optically bonded.

Next, there is described with reference to FIGS. 2 and 3 how to create a lens effect using a refractive index distribution created within the laser medium 5 in the mode control waveguide-type laser device in FIG. 1, the refractive index distribution being created by generating a desired temperature distribution within the laser medium 5.

In FIG. 3, taking notice of the heat sink 2, a junction region (comb teeth shape) in the heat sink 2 to be bonded via the bonding agent 3 onto the cladding 4 is indicated with hatching in order clarify the difference between a junction region which is bonded via the bonding agent 3 with the cladding 4 and a region which is not bonded with the cladding 4.

Moreover, as illustrated in FIG. 3, the total length of the laser medium 5 in the optical axis 6 (z axis) direction is represented by $L_o$ and the width of a comb structure portion partially provided in the optical axis direction is represented by A.

In this case, a junction part (an adjustment side forming the width A) of the comb structure is provided on the end surface 2b side, that is, on the exit side of the optical axis 6.

When the excitation light entering from the end surface 5a of the laser medium 5 is absorbed into the laser medium 5, a part of the power of the absorbed excitation light is converted to heat, thereby generating heat, and the generated heat is discharged via the cladding 4 and the bonding agent 3 to the heat sink 2.

At this time, when the heat sink 2 has a comb shape in the optical axis 6 direction and the range of the heat sink 2 to be bonded with the bonding agent 3 is only the tip part of the comb teeth, in the center between two comb teeth, flows of heat are generated from substantially the center of the two comb teeth to both sides of the x axis direction. Accordingly, the temperature of substantially the center of the two comb teeth becomes maximum, and as being closer to each of the comb teeth, the temperature drops.

On the other hand, an optical material of the laser medium 5 or the like changes in its refractive index substantially in proportion to a difference in temperature, and when, as the optical material of the laser medium 5, a material in which a change in refractive index per unit temperature: dn/dT has a positive value is used, a refractive index in the center of the two comb teeth having the high temperature becomes large, and as being closer to each of the comb teeth, the refractive index becomes small.

As a result, the thermal lens effect whose optical axis is set in the center of the two comb teeth is generated in the x axis direction.

Similarly, when, as the optical material of the laser medium 5, a material in which the change in refractive index per unit temperature: dn/dT has a negative value is used, a refractive index distribution is reverse to a temperature distribution, and the refractive index of a portion bonded onto the comb teeth becomes large while the refractive index in the center of the two comb teeth becomes small.

As a result, the thermal lens effect whose optical axis is set at the portion bonded onto the comb teeth is generated in the x axis direction. Note that, the same effect can be obtained regardless of whether the value of dn/dT is positive or negative. Thus, description is hereinafter made using the case where dn/dT has a positive value otherwise specifically described.

Here, the width A of the comb structure portion in the optical axis 6 (z axis) direction is changed from the case: $A/L_o=0$ (the case where no comb structure exists in the optical axis direction of the heat sink 2) to the case: $A/L_o=1$ (the case where a comb structure exists in the whole optical axis direction of the heat sink 2), thereby allowing the temperature distribution generated within the laser medium 5 to be changed.

Accordingly, it is possible to adjust the thermal lens effect generated within the laser medium 5.

Next, there is described with reference to FIGS. 4 and 5 the case where the width A of the comb structure portion in the optical axis direction is changed from the case: $A/L_o=0$ (the case where no comb structure exists in the optical axis direction of the heat sink 2) to the case: $A/L_o=1$ (the case where comb structure exists in the whole optical axis direction of the heat sink 2), in the first embodiment of the present invention illustrated in FIGS. 1 to 3.

Figure 4:
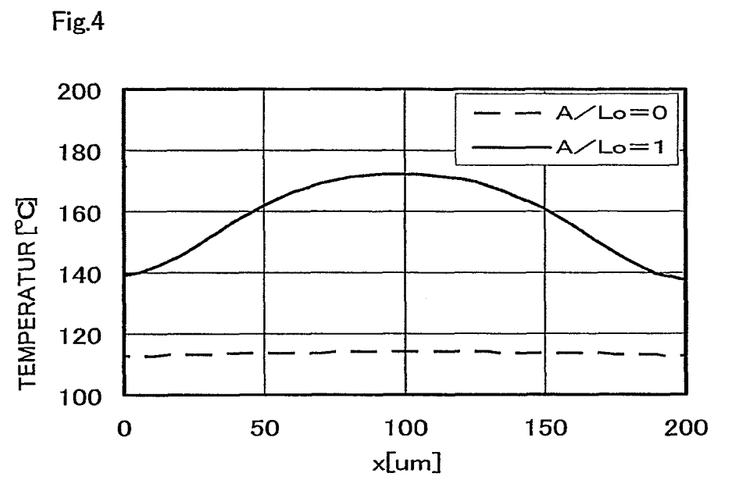
FIG. 4 An explanatory diagram showing an example of calculation results of a temperature distribution within a laser medium upon excitation in the case of using the mode control waveguide-type laser device in FIG. 1 (Example 1).
Figure 5:
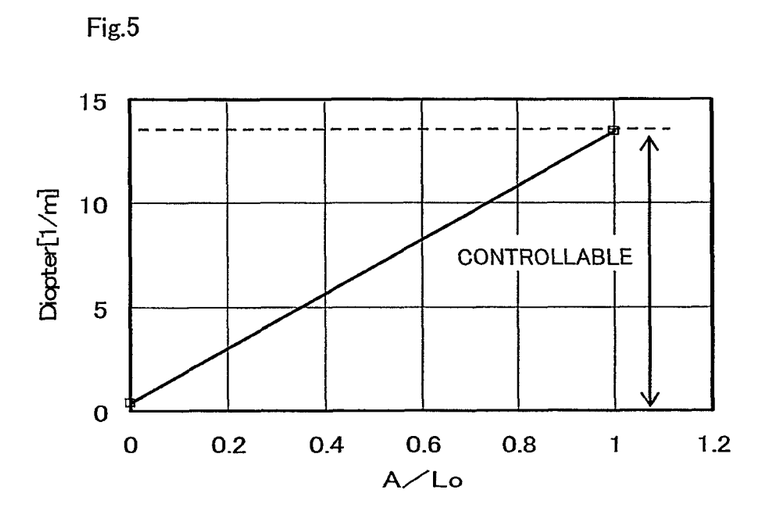
FIG. 5 An explanatory diagram showing an effect in the case of using the mode control waveguide-type laser device in FIG. 1 (Example 1).

FIGS. 4 and 5 are explanatory diagrams showing a calculation example and effect in the case of using Nd:YVO4 as the laser medium 5, and these diagrams show the case of using the condition for calculations: at a room temperature of 25° C., the width (in x axis direction) of the laser medium 5=200 µm, the laser thickness (in y axis direction)=40 µm, the excitation width (which is equal to the comb teeth space in the direction parallel to the optical axis 6)=200 µm, the excitation light power=10 W (light emission wavelength: 808 nm), and the laser light wavelength=1.064 µm.

FIG. 4 shows a temperature distribution of the laser medium 5 under excitation, in the x axis direction (0 to 200 µm) whose center is the y axis direction, and the broken line represents a temperature distribution where $A/L_o=0$ and the solid line represents a temperature distribution where $A/L_o=1$.

Moreover, FIG. 5 shows the change of Diopter [1/m] (the reciprocal of the thermal lens focal distance), that is, the change of the Diopter in the case of changing the width A of the comb structure portion from $A/L_o=0$ to $A/L_o=1$.

In FIGS. 4 and 5, in the case of uniformly exciting the whole laser medium 5, when $A/L_o=0$, the focal distance of the thermal lens generated within the laser medium 5 becomes 2.9 m (Diopter=0.4 [1/m]).

Moreover, when $A/L_o=1$, the focal distance of the thermal lens generated within the laser medium 5 becomes 74.3 mm (Diopter=13.46 [1/m]).

That is, by changing the width A from "0" to "1", the thermal lens focal distance can be optionally adjusted in a range of "2.9 m to 74.3 mm".

Similarly, also in the case of locally exciting a part of the laser medium 5, the efficiency of heat discharge differs depending on the case where the comb structure does not exist in the optical axis 6 (z axis) direction or the case where the comb structure exists in the whole optical axis direction, and hence it is clear that the thermal lens focal distance can be adjusted by changing the width A of the comb structure portion.

Moreover, for example, in the case of end surface excitation where excitation is performed from the end surface 5a side of the laser medium 5 in the optical axis direction, the comb structure can be formed on the end surface 5a side of the incident side.

Thus, in the case of the end surface excitation where excitation is performed from the end surface 5a side of the laser medium 5, the rise of temperature within the laser medium 5 becomes maximum on the end surface 5a side, and the temperature distribution on the end surface 5a side becomes most remarkable. Therefore, it is possible to adjust the thermal lens focal distance in an easiest way by providing the junction part having the comb structure on the end surface 5a side of the incident side.

Moreover, in the case of the end surface excitation where excitation is performed from the end surface 5a side of the incident side, the comb structure may be formed on the end surface 5b side of the exit side, and also in the case where the junction part having the comb structure is provided on the end surface 5b side, the efficiency of heat discharge is improved because the end surface 5a side of the incident side has a larger junction area with the heat sink 2.

As a result, it is possible to adjust the thermal lens effect generated within the laser medium 5 and to suppress the thermal lens effect.

Note that, the case of the end surface excitation where excitation is performed from the end surface 5a side has been exemplified, but in the case where an optical system in the optical axis 6 (z axis) direction is asymmetrical at both end surfaces 5a and 5b of the laser medium 5 and the temperature distribution within the laser medium 5 extends in the optical axis direction, it is clear that the same effect is obtained by providing the above-mentioned comb structure portion.

Moreover, the comb structure in the optical axis direction within the laser medium 5 may be formed on both of the end surfaces 5a and 5b of the laser medium.

Such structure allows the thermal lens focal distance to be adjusted even in the case where a symmetric temperature distribution is generated in the laser optical axis direction within the laser medium 5, as in side surface excitation.

In addition, although a gap between the comb teeth in the heat sink 2 is usually air, the gap may be filled with a thermal insulation material having a smaller thermal conductivity than the heat sink 2. In this case, the refractive index distribution within the laser medium 5 is created by the temperature distribution generated due to the difference in thermal conductivity between the tips of the comb teeth and the thermal insulation material.

Thus, filling the gap with the thermal insulation material in this way allows the front face on the heat discharge side of the cladding 4 to be bonded to the bonding agent 3 to discharge heat generated in the laser medium 5, and hence the rise of temperature of the laser medium 5 can be suppressed. Moreover, the rigidity of the heat sink 2 can be increased as compared to the case of fixing the cladding 4 only at the tips of the comb shape.

In view of the foregoing, the mode control waveguide-type laser device according to the first embodiment (FIGS. 1 to 5) of the present invention includes: the laser medium 5 that is planar, has a waveguide structure in the thickness direction of the cross section perpendicular to the optical axis 6, and generates gain with respect to laser light; the cladding 4 bonded onto one surface of the laser medium 5; and the heat sink 2 bonded via the cladding 4 onto the one surface side of the laser medium 5, in which the laser medium 5 creates a lens effect due to a refractive index distribution, and the laser light oscillates in a waveguide mode in the thickness direction and also oscillates in a spatial mode due to the lens effect in the direction perpendicular to the optical axis 6 and the thickness direction.

In the above-mentioned structure, the refractive index distribution within the laser medium 5 is created by generating a desired temperature distribution in the laser medium 5 due to a junction area of the cladding 4 with the heat sink 2.

Specifically, the heat sink 2 includes, in a part of the optical axis 6 of the laser light, the junction part (the hatching part in FIG. 3) having a comb structure parallel to the optical axis 6, and the refractive index distribution within the laser medium is created by generating the desired temperature distribution in the laser medium by adjusting the range of the comb structure.

Thus, the adjustment of the junction area of the cladding 4 with the heat sink 2 allows the refractive index distribution and the lens effect generated within the laser medium 5 to be adjusted. Heat is discharged from the whole surface in a place where heat generation is large to drop the temperature, and the thermal lens is created in a place where the heat generation is small, thereby realizing the mode control waveguide-type laser device with improved reliability.

Moreover, in FIG. 3, a junction part having the comb structure (an opening part resulting in an adjustment side) is provided on a junction surface of the laser medium 5 except for an incident surface to which the laser light of the optical axis 6 enters.

That is, the junction part having the comb structure is provided on the junction surface on the end surface 2b side, that is, on the junction surface with an exit surface (end surface 5b) of the laser medium 5 from which the laser light of the optical axis 6 exits, and the junction part which does not have the comb teeth is provided on the junction surface on the end surface 2a side, that is, on the junction surface with an incident surface (end surface 5a) of the laser medium 5.

This allows heat generation to be suppressed on the incident side where the temperature easily rises.

Example 2

Figure 6:
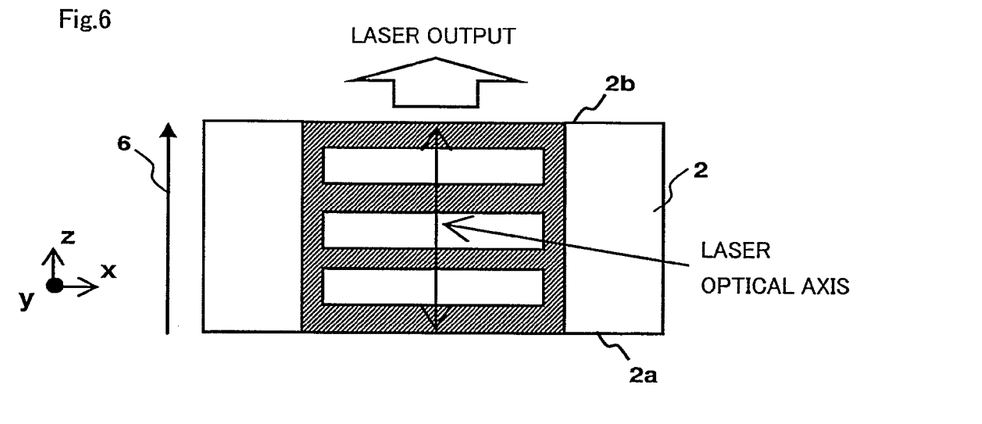
FIG. 6 A cross sectional view of a mode control waveguide-type laser device according to a second embodiment of the present invention, taken along the cross section line b-b' of FIG. 1 as seen from the top face (Example 2).

Note that, in the above-Mentioned first embodiment (FIGS. 1 to 5), in order to adjust the thermal lens generated within the laser medium 5, the comb structure is provided in a part of the heat sink 2 in the optical axis 6 (z axis) direction, and the temperature distribution within the waveguide is adjusted by adjusting the width A of the comb structure portion, but as illustrated in FIG. 6, there may be provided in discontinuity a plurality of the comb structure portions in the heat sink 2 in the optical axis direction.

A second embodiment of the present invention is hereinafter described with reference to FIGS. 1 and 6.

FIG. 6 is a cross sectional view illustrating the shape of a heat sink 2 of a mode control waveguide-type laser device according to the second embodiment of the present invention and illustrates the above-mentioned cross section b-b' (FIG. 1).

In this case, the whole structure is the same as illustrated in FIG. 1 except that the comb shape of the heat sink 2 is different from the above-mentioned shape, and this structure has the same function as the pumping light incident means 1 to the laser medium 5 as described above (FIG. 1) unless otherwise specifically described.

In the case where a single comb structure is provided as in the above-mentioned first embodiment (FIGS. 1 to 3), the junction area of the cladding 4 with the heat sink 2 increases as the width A of the comb structure portion in the optical axis direction of the heat sink 2 becomes narrower, and the refractive index distribution is generated also in the y axis direction due to the thermal distribution generated by heat discharge. As a result, a thermal lens is generated also in the y axis direction.

By contrast, according to the second embodiment (FIG. 6) of the present invention, the above-mentioned problem (the generation of the thermal lens in the y axis direction) can be solved by providing in discontinuity a plurality of the comb structure portions in the heat sink 2 in the optical axis direction.

In FIG. 6, a plurality of comb structures in the heat sink 2 in the optical axis direction are arranged in discontinuity, and the focal distance of the thermal lens generated within the laser medium 5 can be adjusted by adjusting the width of each of the comb structure portions.

Moreover, it is possible to adjust the focal distance of the thermal lens also by adjusting the number of the comb structures having a certain width.

By the way, in FIG. 6, although the comb structure portions have the same width, the comb structure portions are not necessarily required to have a uniform width.

In view of the foregoing, in the mode control waveguide-type laser device according to the second embodiment (FIGS. 1 and 6) of the present invention, the plurality of junction parts having the comb structure are arranged in discontinuity from the incident surface of the laser medium 5 to which the laser light of the optical axis 6 enters, and a portion where the heat sink 2 is bonded via the bonding agent 3 with the cladding 4 and a portion where the heat sink 2 is not bonded with the cladding 4 are alternately distributed in the optical axis 6 (z axis) direction.

This allows the thermal conductivity in the optical axis direction to be increased, and as a result, it is possible to average the heat distribution generated in the y axis direction to a direction parallel to the optical axis 6, thereby reducing the generation of the thermal lens in the y axis direction.

In addition, similarly to the above, although a gap between the comb teeth of the heat sink 2 is usually air, the gap may be filled with a thermal insulation material having a smaller thermal conductivity than the heat sink 2. In this case, the refractive index distribution within the laser medium 5 is created by the temperature distribution generated due to the difference in thermal conductivity between the tips of the comb teeth and the thermal insulation material.

Thus, filling the gap with the thermal insulation material in this way allows the front face on the heat discharge side of the cladding 4 to be bonded to the bonding agent 3 to discharge heat generated in the laser medium 5, and hence the rise of temperature of the laser medium 5 can be suppressed. Moreover, the rigidity of the heat sink 2 can be increased as compared to the case of fixing the cladding 4 only at the tips of the comb shape.

Example 3

In addition, although no particular reference has been made in the above-mentioned first and second embodiments (FIGS. 1 to 6), in the laser oscillation in the x axis direction within a laser resonator, the width (x axis) of the laser medium 5 is sufficiently large as compared to the wavelength of the laser light, and therefore the mode of the waveguide in the y axis is not selected, which results in a laser resonator in a spatial mode.

Figure 7:
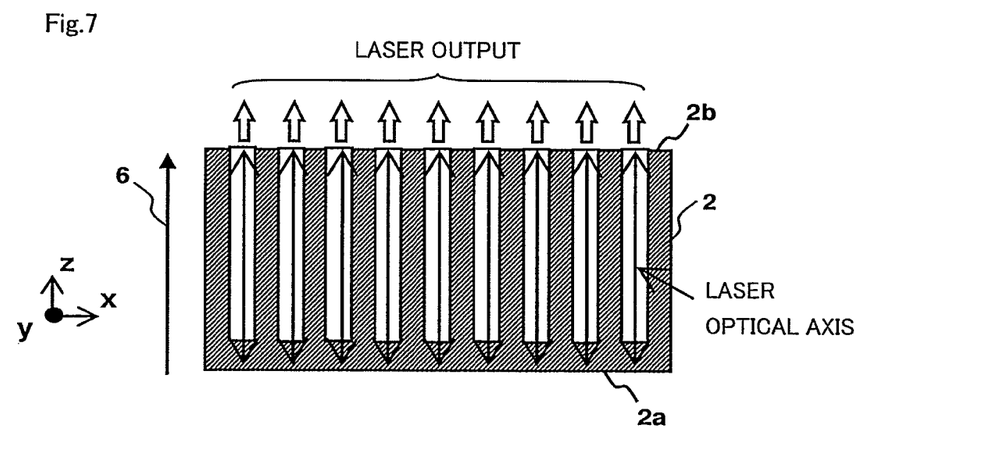
FIG. 7 A cross sectional view of a mode control waveguide-type laser device according to a third embodiment of the present invention, taken along the cross section line b-b' of FIG. 1 as seen from the top face (Example 3).

Hence, as illustrated in FIG. 7, there may be provided, in a direction parallel to the optical axis 6 of the heat sink 2, a plurality of comb teeth to be bonded to the cladding 4 via the bonding agent 3 so that the thermal lens effect whose optical axis is in the center of two comb teeth may periodically occur in the x axis direction within the laser medium 5, thereby allowing a plurality of cyclic oscillation modes to be created in the x axis direction.

A third embodiment of the present invention is hereinafter described with reference to FIGS. 1 and 7.

FIG. 7 is a cross sectional view illustrating the shape of a heat sink 2 of a mode control waveguide-type laser device according to the third embodiment of the present invention and illustrates the above-mentioned cross section b-b' (FIG. 1).

In this case, the whole structure is the same as illustrated in FIG. 1 except that the comb shape of the heat sink 2 is different from the above-mentioned shape, and this structure has the same function as the pumping light incident means 1 to the laser medium 5 as described above (FIG. 1) unless otherwise specifically described.

In the third embodiment of the present invention, there is realized a mode control waveguide-type laser device which is configured to create a refractive index distribution within the laser medium 5 by generating a desired temperature distribution in the laser medium 5, to create, by this refractive index distribution, a lens effect which is an effect obtained by arranging a plurality of lenses in the x axis direction, to oscillate in a waveguide mode in the y axis direction, and to oscillate in a plurality of spatial modes due to the lens effect in the x axis direction.

In FIG. 7, the width A (see FIG. 3) of the comb structure in the optical axis 6 (z axis) direction of the heat sink 2 is changed from the case where the comb structure does not exist in the optical axis direction (the case where the comb structure portions are held in contact with each other) to the case where the comb structure exists in the whole optical axis direction, or the number of a plurality of comb structure portions existing in the optical axis direction is adjusted, thereby adjusting the thermal lens focal distance of the laser medium 5.

In view of the foregoing, in the mode control waveguide-type laser device according to the third embodiment (FIGS. 1 and 7) of the present invention, due to the refractive index distribution, the laser medium 5 creates a lens effect which is an effect obtained by arranging a plurality of lenses in the direction (x axis) perpendicular to the optical axis 6 and the thickness direction, and the laser light oscillates in a waveguide mode in the thickness direction (y axis) while oscillating in a plurality of spatial modes due to the lens effect in the direction (x axis) perpendicular to the optical axis 6 and the thickness direction.

According to the structure in FIG. 7, the thermal lens generated within the laser medium 5 can be controlled even in a mode control waveguide-type laser device capable of outputting high power laser light in which power of the excitation light is increased by using a broad area LD having a broad light emission region or an LD array having emitters arranged in one line, which facilitates higher power.

In addition, similarly to the above, although a gap between the comb teeth of the heat sink 2 is usually air, the gap may be filled with a thermal insulation material having a smaller thermal conductivity than the heat sink 2. In this case, the refractive index distribution in the laser medium 5 is created by the temperature distribution generated due to the difference in thermal conductivity between the tips of the comb teeth and the thermal insulation material.

Thus, filling the gap with the thermal insulation material in this way allows the front face on the heat discharge side of the cladding 4 to be bonded to the bonding agent 3 to discharge heat generated in the laser medium 5, and hence the rise of temperature of the laser medium 5 can be suppressed. Further, the rigidity of the heat sink 2 can be increased as compared to the case of fixing the cladding 4 only at the tips of the comb shape.

Example 4

Figure 8:
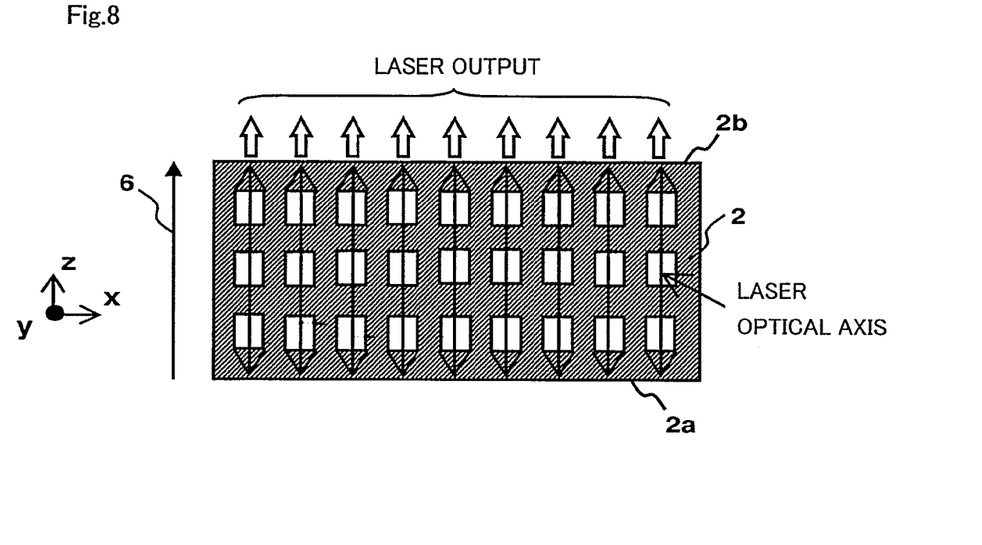
FIG. 8 A cross sectional view of a mode control waveguide-type laser device according to a fourth embodiment of the present invention, taken along the cross section line b-b' of FIG. 1 as seen from the top face (Example 4).

Note that, in the above-mentioned third embodiment (FIG. 7), in order to adjust the focal distance of the thermal lens generated within the laser medium 5, in a device which is configured to create a plurality of lens effects in the x axis direction, to oscillate in a waveguide mode in the y axis direction, and to oscillate in a plurality of spatial modes due to the lens effects in the x axis direction, the temperature distribution within the waveguide is adjusted by providing the comb structure in the heat sink 2 in the optical axis direction and adjusting the width A of the comb structure portion or the number of the plurality of comb structure portions, but there may be provided in discontinuity a plurality of comb structure portions in the heat sink 2 in the optical axis (z axis) direction as illustrated in FIG. 8.

A fourth embodiment of the present invention is hereinafter described with reference to FIGS. 1 and 8.

FIG. 8 is a cross sectional view illustrating the shape of a heat sink 2 of a mode control waveguide-type laser device according to the fourth embodiment of the present invention and illustrates the above-mentioned cross section b-b' (FIG. 1).

In this case, the whole structure is the same as illustrated in FIG. 1 except that the comb shape of the heat sink 2 is different from the above-mentioned shape, and this structure has the same function as the pumping light incident means 1 to the laser medium 5 as described above (FIG. 1) unless otherwise specifically described.

In the case of the above-mentioned third embodiment (FIG. 7), as the comb structure portion of the heat sink 2 in the optical axis direction becomes narrower, the refractive index distribution is generated also in the y axis direction due to the thermal distribution generated by heat discharge. As a result, the thermal lens is generated also in the y axis direction.

By contrast, according to the fourth embodiment (FIG. 8) of the present invention, providing in discontinuity a plurality of comb structure portions in the heat sink 2 in the optical axis direction solves the above-mentioned problem also in a device which is configured to create a refractive index distribution within the laser medium 5 by generating a desired temperature distribution in the laser medium 5, to create, due to this refractive index distribution, a lens effect which is an effect obtained by arranging a plurality of lenses in the x axis direction, to oscillate in a waveguide mode in the y axis direction, and to oscillate in a plurality of spatial modes due to the lens effect in the x axis direction.

In FIG. 8, the plurality of comb structure portions of the heat sink 2 in the optical axis (z axis) direction are provided in discontinuity, and it is possible to adjust the focal distance of the thermal lens generated within the laser medium 5 by adjusting the width A (see FIG. 3) of the comb structure portions, and to adjust the focal distance of the thermal lens generated within the laser medium 5 also by adjusting the number of the comb structure portions each having a certain width.

In addition, the widths A of the comb structure portions are not necessarily required to be constant.

In view of the foregoing, in the mode control waveguide-type laser device according to the fourth embodiment (FIGS. 1 and 8) of the present invention, a portion where the heat sink 2 is bonded with the cladding 4 via the bonding agent 3 and a portion where the heat sink 2 and the cladding 4 are not bonded with each other are alternately distributed in the optical axis direction, thereby increasing the conductivity of heat in the direction parallel to the optical axis 6, and as a result, it is possible to average the thermal distribution generated in the y axis direction to a direction parallel to the optical axis 6, and to reduce the thermal lens in the y axis direction also in a laser device which has a plurality of cyclic oscillation modes in the x axis direction.

Moreover, the thermal lens generated within the laser medium 5 can be controlled also in a mode control waveguide-type laser device capable of outputting high power laser light in which power of the excitation light is increased by using a broad area LD having a broad light emission region or an LD array having emitters arranged in one line, which facilitates high outputting.

In addition, similarly to the above, although a gap between the comb teeth of the heat sink 2 is usually air, the gap may be filled with a thermal insulation material having a smaller thermal conductivity than the heat sink 2. In this case, the refractive index distribution in the laser medium 5 is created by the temperature distribution due to the difference in thermal conductivity between the tips of the comb teeth and the thermal insulation material.

Thus, filling the gap with the thermal insulation material in this way allows the front face on the heat discharge side of the cladding 4 to be bonded to the bonding agent 3 to discharge heat generated in the laser medium 5, and hence the rise of temperature of the laser medium 5 can be suppressed. Further, the rigidity of the heat sink 2 can be increased as compared to the case of fixing the cladding 4 only at the tips of the comb shape.

In the above-mentioned first to fourth embodiments, in order to discharge heat on the whole surface on the incident side where heat generation is large, and to adjust and create the thermal lens on the exit side where heat generation is small, as illustrated in FIGS. 3 and 7, the junction part having the comb structure is provided on the junction surface with the exit surface (end surface 5b) of the laser medium 5 from which the laser light of the optical axis 6 exits, but when the adjustment effect of the thermal lens takes priority over the suppression effect of heat generation, the junction part having the comb structure may be provided on demand on the junction surface of the end surface 5a on the incident side where the temperature distribution is strong.

REFERENCE SIGNS LIST

1 pumping light incident means, 2 heat sink, 3 bonding agent, 4 cladding, 5 laser medium, 5a, 5b end surface, 6 optical axis

The invention claimed is:

1. A mode control waveguide-type laser device, comprising:
    a laser medium, which is planar and has a waveguide structure in a thickness direction of a cross section perpendicular to an optical axis direction, configured to generate a gain with respect to laser light;
    a cladding bonded onto one surface of the laser medium; and
    a heat sink bonded via the cladding onto the one surface side of the laser medium,
    wherein the heat sink comprises both a first junction part having a comb structure that is parallel to the optical axis direction, and a second junction part not having the comb structure, the second junction part being disposed perpendicular to the comb structure at an incident surface of the laser medium.

2. A mode control waveguide-type laser device according to claim 1,
    wherein the laser medium creates the lens effect which is an effect obtained by arranging a plurality of lenses in the direction perpendicular to the optical axis and the thickness direction, due to the refractive index distribution, and
    wherein the laser light oscillates in the waveguide mode in the thickness direction, and oscillates in a plurality of the spatial modes due to the lens effect in the direction perpendicular to the optical axis and the thickness direction.

3. A mode control waveguide-type laser device according to claim 1, wherein the desired temperature distribution is generated in the laser medium by adjusting a range of the comb structure, thereby creating the refractive index distribution within the laser medium.

4. A mode control waveguide-type laser device according to claim 3, wherein the junction part having the comb structure is provided on a junction surface with the incident surface of the laser medium to which the laser light of the optical axis enters.

5. A mode control waveguide-type laser device according to claim 3, wherein the junction part having the comb structure is provided on a junction surface with an exit surface of the laser medium from which the laser light of the optical axis exits.

6. A mode control waveguide-type laser device according to claim 3, wherein the junction part having the comb structure is provided on a junction surface except for the incident surface of the laser medium to which the laser light of the optical axis enters.

7. A mode control waveguide-type laser device according to claim 3, wherein the junction part having the comb structure is provided on a junction surface except for an exit surface of the laser medium from which the laser light of the optical axis is exits.

8. A mode control waveguide-type laser device according to claim 3, wherein a plurality of the junction parts having the comb structure are provided in discontinuity from the incident surface of the laser medium to which the laser light of the optical axis enters.

* * * * *